US007289648B2

(12) United States Patent
Liu

(10) Patent No.: US 7,289,648 B2
(45) Date of Patent: *Oct. 30, 2007

(54) SYSTEM AND METHOD FOR MODELING THREE DIMENSIONAL OBJECTS FROM A SINGLE IMAGE

(75) Inventor: Zicheng Liu, Bellevue, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/672,953

(22) Filed: Feb. 8, 2007

(65) Prior Publication Data

US 2007/0127810 A1 Jun. 7, 2007

Related U.S. Application Data

(63) Continuation of application No. 10/637,223, filed on Aug. 8, 2003, now Pat. No. 7,218,774.

(51) Int. Cl.
*G06K 9/00* (2006.01)
*G06K 9/36* (2006.01)
*G06T 17/00* (2006.01)

(52) U.S. Cl. .................. 382/118; 382/154; 382/276; 345/420

(58) Field of Classification Search ................ 382/118, 382/154, 276, 285; 345/419, 420, 473, 426, 345/582, 441, 646; 703/1, 2, 6; 715/964; 700/98, 182
See application file for complete search history.

(56) References Cited

U.S. PATENT DOCUMENTS

2005/0031195 A1* 2/2005 Liu .......................... 382/154

* cited by examiner

*Primary Examiner*—Sheela Chawan
(74) *Attorney, Agent, or Firm*—Lyon & Harr, LLP; Katrina A. Lyon

(57) ABSTRACT

A system and method for automatically modeling a three dimensional object, such as a face, from a single image. The system and method according to the invention can construct one or more three dimensional (3D) face models using a single image. Although use of a frontal image simplifies the processing, the system and method according to the invention can also generate a 3D model from a non-frontal image (e.g., an image where the object to be modeled has an out of plane rotation, such as a face that is turned to one side to some extent). The system is fully automatic. It is fast compared to the other modeling systems, Furthermore, it is very robust. It can be used to construct personalized models for games, on-line chat, and so on. It can also be used as a tool to generate a database of faces with various poses which are needed to train most face recognition systems.

19 Claims, 6 Drawing Sheets

US 7,289,648 B2

SYSTEM AND METHOD FOR MODELING THREE DIMENSIONAL OBJECTS FROM A SINGLE IMAGE

The above-identified application is a continuation of a prior application entitled "System and Method for Modeling Three Dimensional Objects from a Single Image" which was assigned Ser. No. 10/637,223, now patent (U.S. Pat. No. 7,218,774 B2) and was filed on Aug. 8, 2003.

BACKGROUND

1. Technical Field

This invention is directed toward a fully automatic system and method for modeling objects from an image. More specifically, the invention is directed toward a fully automatic system and method for modeling three-dimensional objects, such as faces, from a single image.

2. Background Art

There has been much work on face modeling from images. One technique which has been used in many commercial systems employs two orthogonal views—one frontal view and one side view in order to create a face model. This type of system requires the user to manually specify the face features on the two images in order to model the face. There are, however, some of these face-modeling systems employing more than one input image that have attempted to employ some feature finding methods to reduce the amount of manual work necessary to create the resulting model.

Another type of face modeling system creates face models from a video sequence. Since this type of system has available images of multiple views of the face to be modeled, it can potentially compute the correct depth and can generate a texture image for an entire face. However, this type of system requires the user to have a video camera. In addition, this type of system requires some amount of user input to render accurate models and make it robust.

Another approach to generating face models from a single image, described by V. Blanz and T. Vetter [1], requires the use of both a geometry database and an image database to generate three-dimensional (3D) models. However, this approach can only model the people whose skin types are covered by the database. In this approach, the database used mainly consisted of Caucasian people. Therefore, it is difficult to model people of other races. It would require an extremely large image database to cover people of all races. Another problem with this modeling approach is that the images in the database contain the lighting conditions when those images were taken. Given a new image, its lighting condition is in general different from the lighting condition in the database. The approach described by Blanz et al. employs a linear method to adjust the lighting, but lighting condition changes cannot be modeled very well by a linear technique. Therefore, the system has difficulties in handling arbitrary lighting conditions. In addition, it requires manual initialization to provide the location of the face, its pose, and face features. Hence, the system is not fully automatic. Finally, this system is computationally expensive and not very robust because it has a large amount of unknowns, must perform a large number of image operations, and a large percentage of the equations used are highly nonlinear.

What is needed is a system that can create a 3D model of a face, or similar object, using a single image, that does not require user interaction, is fast and computationally efficient, can model people of any skin types in various lighting conditions, and is robust.

SUMMARY

The invention is directed toward a system and method for automatically modeling a three dimensional object, such as a face, from a single image. The system and method according to the invention can construct one or more three dimensional (3D) face models using a single image. Although use of a frontal image simplifies the processing, the system and method according to the invention can also generate a 3D model from a non-frontal image (e.g., an image where the object to be modeled has an out of plane rotation, such a face that is turned to one side to some extent).

In general, a single image of an object is input into the system and method according to the invention. An object detector is used to find the object to be modeled in the image. Then the features of the object are determined. If the feature determination process action shows that the object is rotated out of the plane of the image, the amount of rotation is determined. This rotation information can be used to rotate a generic model of an object to match the pose of the object in the input image. The features of the object to be modeled are then used to align the feature points of the object in the image to a generic model of the object. Once the generic model is so tailored to match the object in the image, the texture of the originally input image can be applied. The tailored model can then be used for various applications.

For example, one embodiment of the invention is directed toward a face modeling system and method. In this embodiment, a single image of a face is input. A face detector is used to find the face to be modeled in the image. Then the features of the object are determined. If the feature determination process shows that the face is rotated out of the plane of the image, the amount of out-of-plane rotation of the face is determined The out-of-plane rotation information can be used to align a generic neutral face model with the pose of the face in the image. The features are then used to align the feature points of the face in the image to a generic face model. In one embodiment of the invention, a generic face model of a neutral face is employed as is discussed below. Once the generic face model is tailored to match the face in the image, the texture of the original image can be applied to the tailored generic face model. The tailored model can then be used for various applications, such as animation, gaming, and preparing a database for face recognition training. Although this invention is described relative to a face model, it should be noted that many other types of objects could be modeled. For example, it is possible to create a generic model of the human body as was done for the face using the same techniques of the process described above with a different generic model.

As to the specifics of the generic neutral face model discussed above, in one embodiment of the invention a face is represented as a linear combination of a neutral face and some number of face metrics. In an illustrative embodiment, a face metric can correspond to a vector that linearly deforms aspects of a generic neutral face model in a certain manner, such as to make the head wider, make the nose bigger, and so on. The face geometry is denoted by a vector $S=(v_1^T, \ldots, v_n^T)^T$ where $v_i=(X_i,Y_i,Z_i)^T$ ($i=1, \ldots, n$) are the vertces, and a metric by a vector $M=(\delta v_1, \ldots, \delta v_n)^T$, where $\delta v_i=(\delta X_i,\delta Y_i,\delta Z_i)^T$. Given a neutral face $S^o=(v_1^{oT}, \ldots, v_n^{oT})^T$, and a set of m metrics $M^j=(\delta v_1^{jT}, \ldots, \delta v_n^{jT})^T$, the linear space of face geometries spanned by these metrics is $$S = S^0 + \sum_{j=1}^{m} c_j M^j \text{ subject to } c_j \in [l_j, u_j]$$

where the S is the new face model the $c_j$'s are the metric coefficients (e.g., scalars to scale the metrics) which will be different for different faces and $l_j$ and $u_j$ are the valid range of $c_j$. The neutral face and all of the associated metrics are typically designed by an artist. It is only necessary to create the neutral face representation once. In one embodiment of the invention, the neutral face representation contains 194 vertices and 360 triangles. There are 65 metrics in this embodiment. It should be noted, however, that the neutral face could also be represented with less or more vertices and triangles.

The system can be fully automatic. It is fast compared to the other modeling systems (e.g., the system and method according to the invention has half the unknowns of the previously discussed Blanz approach to face modeling). Furthermore, it is very robust. It can be used to construct personalized models for games, animation, on-line chat, and so on. It can also be used as a tool to generate a database of faces with various poses which are needed to train most face recognition systems.

It is noted that in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

In addition to the just described benefits, other advantages of the present invention will become apparent from the detailed description which follows hereinafter when taken in conjunction with the drawing figures which accompany it.

DESCRIPTION OF THE DRAWINGS

The specific features aspects, and advantages of the invention will become better understood with regard to the following description appended claims, and accompanying drawings where:

DETAILED DESCRIPTION OF THE PREFERRED EMBODIMENTS

In the following description of the preferred embodiments of the present invention, reference is made to the accompanying drawings that form a part hereof and in which is shown by way of illustration specific embodiments in which the invention may be practiced. It is understood that other embodiments may be utilized and structural changes may be made without departing from the scope of the present invention.

1.0 Exemplary Operating Environment

Figure 1:
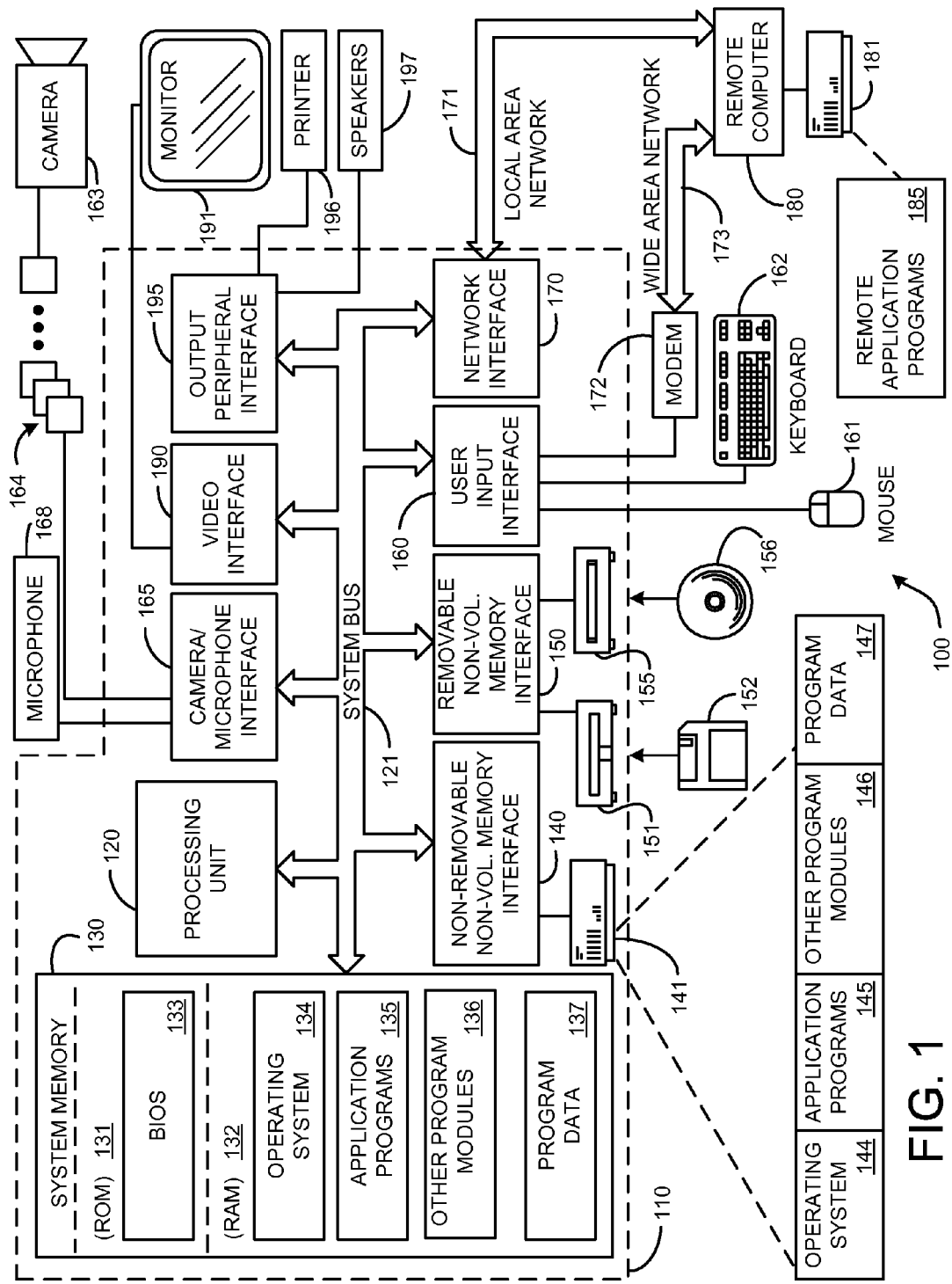
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing to devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 A System and Method for Modeling Three Dimensional Objects from Single Image

2.1 General Overview

Figure 2:
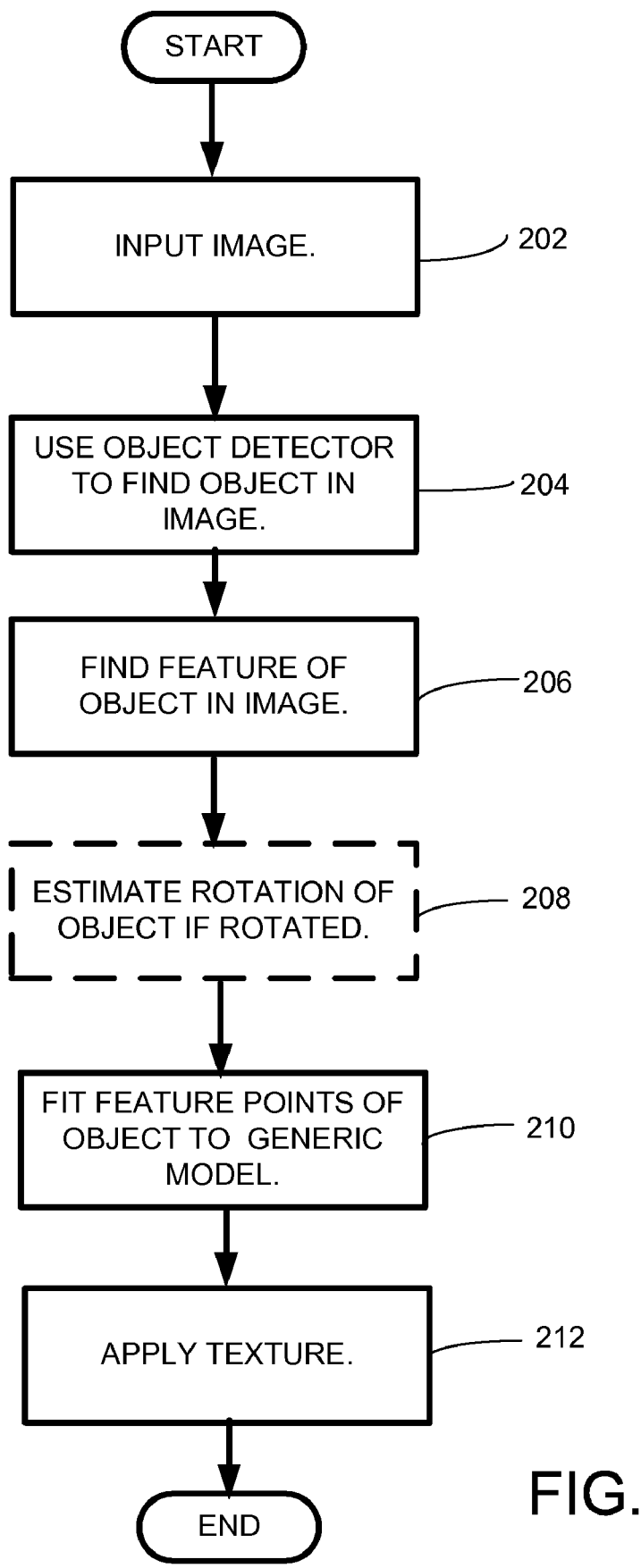
FIG. 2 is a simplified flow diagram of the overall modeling process employed by the object modeling system and method according to the invention.

In the most general sense, a single image of an object is input into the system and method according to the invention and a three-dimensional (3D) mesh with the texture of the original image is output. An overall flow diagram of the 3D modeling system and method is shown in FIG. 2. As shown in FIG. 2, process action 202, an image of an object is input into the system and method according to the invention. An object detector is used to find the object to be modeled in the image, as shown in process action 204. Then the features of the object are determined (process action 206). If the feature determination process action shows that the object is rotated out of the plane of the image, the amount of rotation is determined (process action 208), and this information is used to rotate the model to match the input image. The features of the object to be modeled are then used to align the feature points of the object in the image to a generic model of the object (process action 210). Once the generic model is so tailored to match the object in the image, the texture of the original image is applied (process action 212). The tailored model can be used for various applications.

Figure 3:
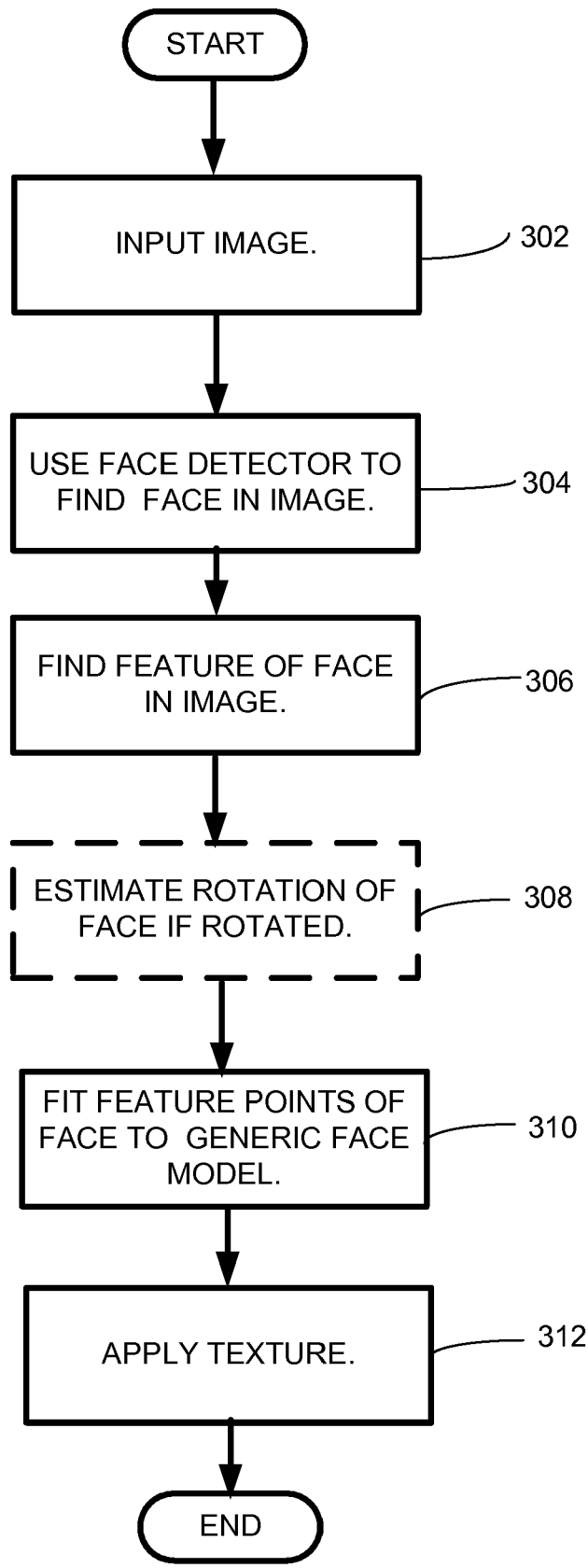
FIG. 3 is a simplified flow diagram of the overall modeling process employed by the object modeling system and method according to the invention in modeling a face.

One embodiment of the invention is directed toward a face modeling system and method. As shown in FIG. 3, process action 302, a single image of a face is input. A face detector is used to find the face to be modeled in the image, as shown in process action 304. Then the features of the object are determined, as shown in process action 306. If the feature determination process action shows that the object is rotated out of the plane of the image, the amount of rotation is determined, and this information is used to rotate the neutral general face model to match the pose of the face in the input image (process action 308). The features are then used to align the feature points of the face in the image to a generic face model (process action 310). Once the generic face model is tailored to match the face in the image, the texture of the face in the input image is applied to the tailored model (process action 312). The tailored model can then be used for various applications, such as animation, gaming, and preparing a database for face recognition training.

2.2 Linear Class of Face Geometries

In the system and method according to the invention, the same representation for the face model is used as was described in [2]. In this paper, a user takes two images with a small relative head motion, and two video sequences: one with head turning to each side. The user then locates five markers in certain base images. The five markers correspond to the two inner eye corners, nose top, and two mouth corners. The next processing stage then computes the face mesh geometry and the head pose with respect to the camera frame using the two base images and markers as input. The final stage determined the head motions in the video sequences, and blended the images to generate a facial texture map.

In the invention, like the above-described paper, a face is represented as a linear combination of a neutral face and some number of face metrics. A metric is vector that linearly deforms a face in a certain way, such as to make the head wider, make the nose bigger, and so on. The face geometry is denoted by a vector $S=(v_1^T, \ldots, v_n^T)^T$, where $v^i=(X_i,Y_i,Z_i)^T$ (i=1, . . . ,n are the vertices, and a metric by a vector $M=(\delta v_1, \ldots, \delta v_n)^T$, where $\delta v_i=(\delta X_i,\delta Y_i,\delta Z_i)^T$. Given a neutral face $S^o=(v_1^{oT}, \ldots, v_n^{oT})^T$, and a set of m metrics $M^j=(\delta v_1^{jT}, \ldots, \delta v_n^{jT})^T$, the linear space of face geometries spanned by these metrics is $$S = S^0 + \sum_{j=1}^{m} c_j M^j \text{ subject to } c_j \in [l_j, u_j] \qquad (1)$$

where the S is the new face, the $c_j$'s are the metric coefficients (e.g., scalars to scale the metrics) which will be different for different faces and $l_j$ and $u_j$ are the valid range of $c_j$.

Figure 4:
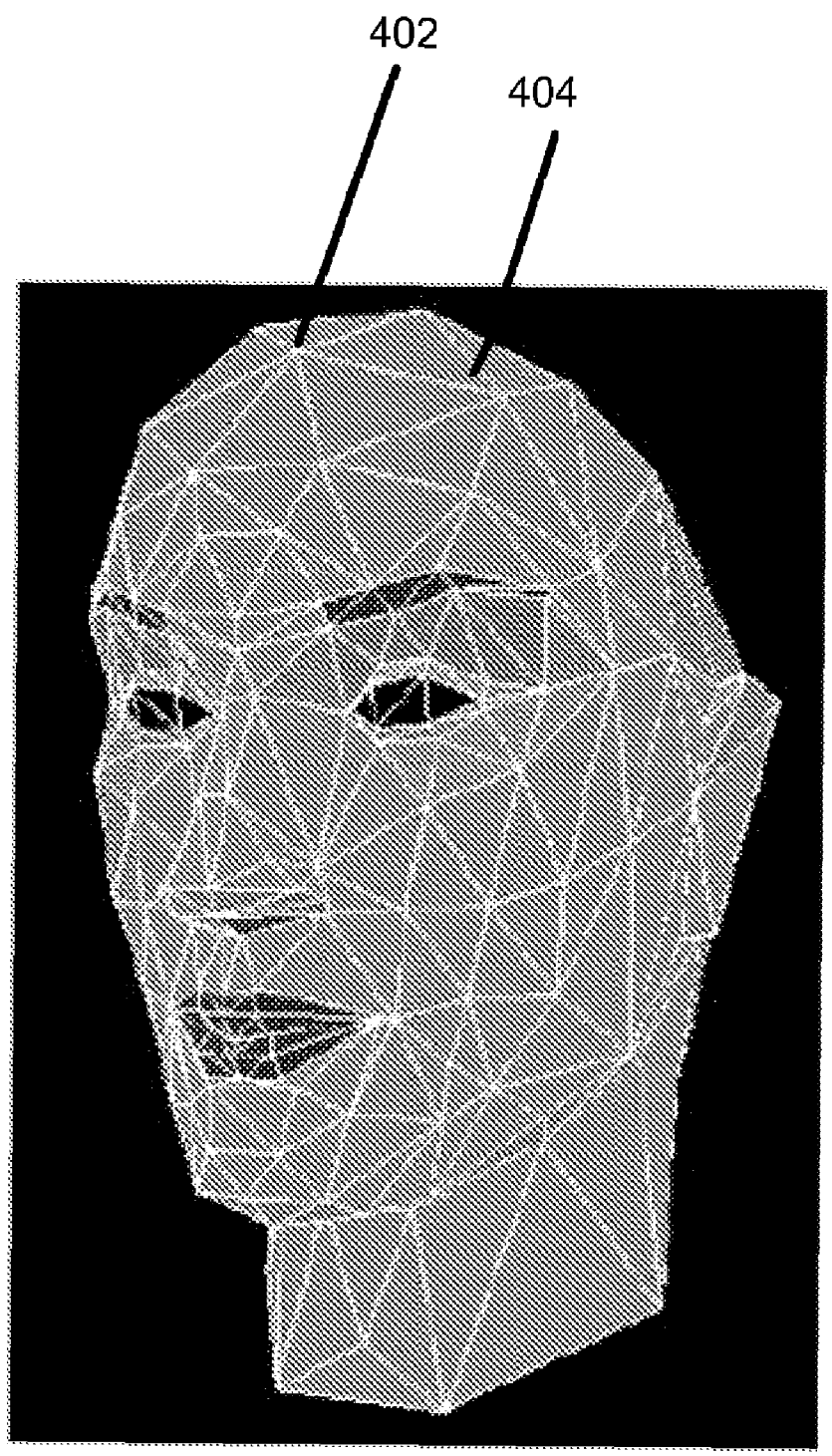
FIG. 4 depicts a neutral face model that is employed in the system and method according to the invention.

The neutral face model and all of the associated metrics are typically designed by an artist. It is only necessary to create the neutral face representation once. In one embodiment of the invention, the neutral face representation (as shown in FIG. 4) contains 194 vertices 402 and 360 triangles 404. There are 65 metrics in this embodiment. It should be noted, however, that the neutral face could also be represented with less or more vertices and triangles.

2.3 Face Model from a Single View

2.3.1 Face Detection and Feature Alignment

Given an image of a face, to find the feature points on the face, one first uses face detection software to detect the face. Any conventional face detection software can be used for this purpose. Once the face is found, the facial features are located on the face. Locating these features can also be performed in a variety of conventional ways. In one embodiment of the invention, face feature alignment software by Yan et al. was used to find the face features. The method is described in [3]. In this embodiment of the invention, the features used were the eyebrows, eyes, nose, mouth and sides of the face. These features can be found by various conventional techniques such as by using pattern recognition, edge detection, or a generic head model. The features in the image and the features in the model are used to align the generic model to the image. If all features or feature points are not visible, additional feature points can be estimated by interpolation between the existing known features.

Figure 5:
FIG. 5 depicts an input image that is employed by the system and method according to the invention to create a three dimensional face model.
Figure 6:
FIG. 6 depicts an image wherein the facial features are detected and used to fit the input image to the face model.

FIG. 5 shows an input image and FIG. 6 shows the feature alignment result. In the embodiment of the invention, shown in FIG. 6, the features selected were the eyebrows, nose, edges of the face and the eyes. However, other features could also be used for the purposes of calculating alignment of the input image and the model.

2.3.2 Model Fitting

It is assumed that the projection of $v_i$ onto the plane is orthogonal, and there are no out-of-the plane rotations for the face. Each of the vertices of the generic face model is described in a 3D coordinate system. In order to adjust the generic model to the object to be modeled, the differences from the neutral face model are calculated (e.g., the 65 metrics). Without loss of generality, denote $v_i=(X_i,Y_i,Z_i)^T$, (i=1, . . . , f) to be the feature points. Denote $\overline{v}_i=(X_i,Y_i)$ to be the projection of $v_i$ on the XY plane. For each feature point $v_i$, denote $m_i$ to be its corresponding coordinate on the input image. Let R denote the 2×2 rotation matrix, be the 2D translation vector, and s be the scale. Then the following equation results:

$$sR\overline{v}_i + t = m_i \qquad (2)$$

From equation 1, $$\overline{v_i} = \overline{v_i^0} + \sum_{j=1}^{m} c_j \overline{\delta v_i^j} \quad (3)$$

Therefore, $$sR\left(\overline{v_i^0} + \sum_{j=1}^{m} c_j \overline{\delta v_i^j}\right) + t = m_i \quad (4)$$

This equation is solved iteratively. In one embodiment of the invention, a conventional technique described by B. K. Horn [4] for determining a closed-form solution to the least-squares problem for three or more points is employed. First one fixes $c_j$ and solves for s, R and t. Then s, R and t are fixed, and equation 4 becomes a linear system which can be solved by using a linear least square procedure. One can then re-estimate s, R and t by using the new estimates of $c_j$'s, and so on. In experiments, for one exemplary embodiment of the invention, it was found that one or two iterations are usually sufficient.

Suppose $c_1, c_2, \ldots, c_m$ are the solutions of equation 4. Then according to equation 1, the mesh of the face is $$S = S^0 + \sum_{j=1}^{m} c_j M^j.$$

2.3.3 Applying Texture to the Model

Once the generic face model is tailored to match the face in the image, the texture of the original image can be applied to the tailored generic face model. For each vertex $v=(X,Y,Z)^T$ on the face mesh, its coordinate on the image is $m=sR\overline{v}+t$, where s,R,t are the solutions of equation 4. Assuming $m=(m_x, m_y)$, its texture coordinate is set to be $$\left(\frac{m_x}{\text{width}}, \frac{m_y}{\text{height}}\right)$$

where width and height are the width and height of the input image, respectively. Given a mesh and a texture image, there are well-known procedures that use the existing graphics library such as Microsoft Corporation's DirectX or OpenGL to render the mesh with the texture.

Figure 7:
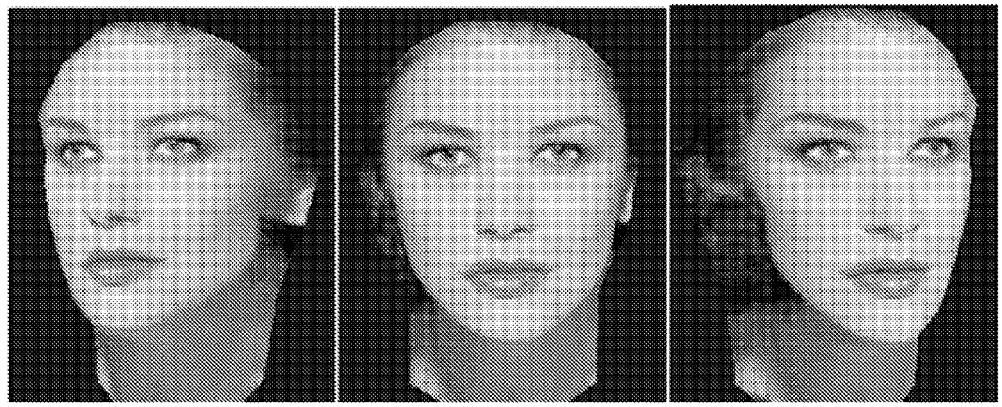
FIG. 7 depicts three different views of the 3D model generated from the input image shown in FIG. 4.

FIG. 7 shows the different views of the reconstructed 3D model based on the input image in FIG. 3. One can see the frontal view (the image in the middle) looks very good as expected. There are quite large rotations for the images on the left and right. These two images still look quite recognizable.

The images used in this exemplary working embodiment of the invention are 640×480 pixels. The total computation time for each image was about 7 seconds on a 1.7 GHz PC. The main computation cost was the face alignment program.

Figure 8:
FIG. 8 depicts three different facial expression that where applied to the face model generated by the system and method according to the invention.

Once the face in the image has been modeled it can be used for various applications. It can be used to construct personalized models for games, online chat, and so on. It can also be used as a tool to generate a database of faces with various poses that are needed to train most face recognition systems. Additionally, further processing can be performed, such as varying the expression on the model by shifting the vertices of the model. Examples of models processed to change their expression are shown in FIG. 8.

Wherefore, what is claimed is:

1. A computer-implemented process for generating a three dimensional model of an object from a single image, comprising the process actions of:
    obtaining an image of an object;
    identifying at least one object to be modeled in the image;
    determining features of the object in the image;
    determining if the object is rotated in the image; and
    aligning the features of a generic model of the identified object with the features of the object in the image, using any rotation, to obtain a tailored model.

2. The computer-implemented process of claim 1 further comprising the process action of:
    applying texture of the object in the image to the tailored generic model.

3. The computer-implemented process of claim 1, wherein determining if the object is rotated in the image comprises the process actions of:
    determining the amount of out of plane rotation of the object in the image; and
    using the amount of rotation of the object in the image to rotate the generic model to match the input image.

4. The computer-implemented process of claim 1, wherein the process action of determining the features of the object comprises determining the features by at least one of the following:
    using a pattern recognition technique to locate the features;
    an edge detection technique to locate the features; and
    using a generic model of the object to locate the features.

5. The computer-implemented process of claim 4 wherein the linear combination of a neutral object is represented by a mesh of vertices and triangles that represent the shape of the object.

6. The computer-implemented process of claim 4 wherein the process action of aligning the feature of a generic model of the object to the features of the object in the image to obtain a tailored model comprises modifying the object metrics so that the generic model matches the shape of the object in the image.

7. The computer-implemented process of claim 1 wherein the generic model of the object is represented as a linear combination of a neutral object, and some number of object metrics, wherein an object metric is a vector that linearly deforms the object in a certain way.

8. The computer-implemented process of claim 1 wherein the object modeled is a face.

9. The computer-implemented process of claim 1 wherein the object modeled is a human body.

10. The computer-implemented process of claim 1 wherein multiple objects are modeled by repeating the following process actions for more than one object:
    identifying at least one object to be modeled in the image;
    determining features of the object in the image; and
    aligning the features of a generic model of the identified object with the features of the object in the image to obtain a tailored model.

11. A system for creating a face model from the input of a single image of a face, the system comprising:
    a general purpose computing device; and
    a computer program comprising program modules executable by the computing device, wherein the computing device is directed by the program modules of the computer program to,
    input a single image of a face;

use a face detector to find the face to be modeled in the image;

determine features of the face to be modeled;

align features of a generic face model to features of the face in the image to obtain a tailored face model, wherein the generic model of a face is represented as a linear combination of a neutral face, and some number of face metrics, wherein a face metric is a vector that can linearly deform the neutral face model in a certain way; and apply the texture of the face in the image to the tailored generic face model.

12. The system of claim 11 further comprising modules to:

determine if the face in the image is rotated out of the plane of the image prior to using the features of the face in the image to align the features of a generic face model with the features of the face;

determine the amount of out of plane rotation of the face in the image; and use the amount of rotation of the face in the image to rotate the generic face model to match the face in the input image.

13. The system of claim 11 wherein the features of the face to be modeled comprise two eyebrows, two eyes, a nose, a mouth and two sides of a face.

14. The system of claim 11 wherein the linear combination of a neutral face is represented by a mesh of vertices and triangles that represent the shape of the face.

15. The system of claim 11 wherein using the features of the object to be modeled to align the features of a generic face model to the feature points of the face in the image comprises modifying the face metrics so that the generic face model matches the shape of the face in the image.

16. The system of claim 11 wherein using the features of the face to be modeled to align the features of a generic face model to the features of the face in the image comprises modifying the face metrics so that the generic face model matches the shape of the face in the image.

17. A computer-readable medium having computer-executable instructions for creating a three-dimensional model of an object in a single image, said computer executable instructions comprising:

inputting a single image of a three-dimensional object;

creating a generic linear space representation of the three-dimensional object depicted in the image;

estimating object pose and linear coefficients describing the three-dimensional object in the image in the linear space using an orthogonal projection;

using the estimated pose and linear coefficients to obtain a linear space model of the object in the image; and applying texture information of the three-dimensional object in the image to the linear space model of the object.

18. The computer-readable medium of claim 17 wherein said computer-executable instruction for creating a generic linear space representation of the three-dimensional object depicted in the image, comprises sub-instructions for:

using an object detector to find the object to be modeled in the image;

determining features of the object; and using the features of the object to be modeled to align the features of a generic linear space representation of the object to the shape of the object in the image.

19. The computer-readable medium of claim 17 further comprising a computer-executable instruction for changing the characteristics of the linear space model of the object by changing the shape of the linear space model of the object in the image underlying the texture.

* * * * *